Dec. 29, 1931.  F. P. KAFKA  1,838,768
FIREPROOFING MOLD
Filed April 10, 1929  6 Sheets-Sheet 1

INVENTOR
FREDERICK P. KAFKA
BY
ATTORNEYS

Dec. 29, 1931.  F. P. KAFKA  1,838,768
FIREPROOFING MOLD
Filed April 10, 1929   6 Sheets-Sheet 5

INVENTOR
FREDERICK P. KAFKA
BY
Newell Spencer
ATTORNEYS

Dec. 29, 1931.  F. P. KAFKA  1,838,768
FIREPROOFING MOLD
Filed April 10, 1929   6 Sheets-Sheet 6

INVENTOR
FREDERICK P. KAFKA
BY
Newell Spencer
ATTORNEYS

Patented Dec. 29, 1931

1,838,768

UNITED STATES PATENT OFFICE

FREDERICK P. KAFKA, OF NEW ROCHELLE, NEW YORK, ASSIGNOR TO BOX FORM CORPORATION, A CORPORATION OF NEW YORK

FIREPROOFING MOLD

Application filed April 10, 1929. Serial No. 354,143.

This invention relates to molds for forming plastic material, concrete for example, into predetermined shapes, and more particularly, the invention pertains to molds employed for fireproofing fabricated metal structures, such as building structures, and for forming the floor and roof slabs of a building.

At present in the art of fireproofing fabricated building structures, it is the common practice to construct the molds, and their support from stock lumber. The lumber for both the molds and their support is cut and shaped to meet each condition and requirement and when once fitted and used, seldom can again be reused to meet a new condition without re-shaping.

The cutting and shaping of the lumber to build the molds and their support requires such accuracy as is only obtainable by skilled workmen and the erection of these molds and their support is therefore an expensive operation in the building of fireproof structures.

Another condition which materially increases the cost of this particular operation in the construction of fireproof structures is the manner in which the molds and their supports are assembled. After the pieces have been cut and shaped to meet existing conditions it is the general practice to secure them together in proper relation by fastenings of a more or less permanent nature such as nails for example, this work also being done by skilled workmen. After the molded structure has set, the molds and their supports are disassembled. Due mainly to the type of fastenings employed, (i. e. nails) this operation is attended with great loss of material mainly from splitting and breaking of the lumber. After the molds have been disassembled or "wrecked", as the operation is termed by those persons skilled in this art, the material is salvaged for future use which is also an expensive operation for the reason that the used material must be sorted, the good from the useless and the nails withdrawn before it can be again used.

This method heretofore described, and which is the method generally employed up to the present time in this art is, therefore, expensive both from the point of consumption of time on the part of skilled labor and the attendant loss of material. Indeed it is the experience of one skilled in this art that in the first building and wrecking of a mold of this type an actual loss of 30% of material results. This loss is due partly to waste in initial shaping of the parts to meet existing conditions and partly to irreparable damage done to material during wrecking and salvaging the material of the mold. A 30% loss also results from each of a second and third operation with the same material, but after a third operation with the original material, what is left usually cannot again be employed as it is for the most part unfit for any use and the general practice is for fireproofers to sell it or give it away as firewood to those who will remove it. Thus it will be seen that as each operation results in a loss of approximately 30% of material, the fireproofing of a large structure results in an actual material loss of many thousands of dollars.

One object of the present invention is to improve the construction of fireproofing molds and their supports and so to construct such molds and their supports that they are capable of substantially universal application and practically unlimited use without damage to the several parts thereof in the disassembling or "wrecking" operation and thereby materially decrease the cost of fireproofing operations.

A feature of the present invention consists in the provision of a new and improved sectional mold for use in fireproofing fabricated structures of the type mentioned, which mold is possessed of such flexibility as will render it capable of substantially universal use.

Different conditions as to shape and dimension are met in every building and in fact on every floor of every building, and it is a further feature of this invention to provide a mold and support therefor which will meet these varying conditions without necessitating cutting or otherwise permanently altering the shape thereof and also, if desirable, rendering unnecessary the employment of skilled mechanics.

Another feature of the invention is so to construct the mold and its support that it may be assembled and rigidly held in position without resorting to the use of nails or other fastenings of a permanent type and thereby rendering it capable of being easily knocked down without damage to any of the elements thereof.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in a preferred form, and the following detailed description of the constructions therein shown.

While the present invention is readily adaptable to use in connection with all types of fabricated metal structure, for the sake of convenience and simplicity of explanation it is herein illustrated in that form in which it is practiced in the fireproofing of the several elements, and the formation of the floor and ceiling slabs of an ordinary fireproof building of more or less conventional construction. It is to be understood, however, that the invention is not limited to use with the precise form of fabricated structure herein illustrated, but is known to readily lend itself to use in connection with fabricated structures of various other and even dissimilar types and that the right to use the same in connection with types of fabricated structures other than that shown is therefore reserved, and that the scope of the invention is limited only by the scope of the appended claims.

Fabricated structures of the herein illustrated type consist generally of a plurality of vertical and horizontal elements secured together to form the skeleton of the finished structure. The vertical elements are known generically in the art as columns. The horizontal members are, generally speaking, of two types, those which connect the vertically disposed members, and which are commonly termed girders, and those which span the spaces between girders and commonly termed beams, and for the purpose of illustrating this invention the foregoing terms will be adhered to throughout the specification and claims.

In the accompanying drawings, the columns are designated by the reference character A. These columns are connected at predetermined points in their height by girders B secured at their ends to the columns in any approved manner. This connecting of the columns A by means of the girders B, together with the beams D, forms a plurality of rectangular spaces C bounded by the girders B and the beams D and it is by filling up these spaces C with suitable material of the desired thickness, preferably a cementitious composition, that the so-called floor slabs of the completed structure are formed. Support for the floor slabs, as well as added rigidity for the fabricated structure, is had by means of the so-called beams D which are connected at their ends to, and preferably supported by the girders B in any approved manner.

The above described fabricated structure forms the skeleton of the completed building and it is the customary practice in constructing buildings of this type to encase the fabricated structure in suitable fireproofing material and it is also considered good engineering practice to mold or cast this casing of fireproof material en masse with the floor slabs in such a manner that a completely integral structure of a monolithic nature results which completely encases the columns, girders and beams, and forms the so-called floor slabs. In some instances, however, the columns are not fireproofed by encasing them with material which forms an integral part of the material which encases the girders and beams, and which forms the floor slabs, and it is in connection with this type of fireproofing that this invention is herein illustrated. It will, however, be perfectly obvious to those skilled in this art that the invention may be practiced to advantage in connection with all types of fireproofing and floor slab construction.

In building up a mold and its support in accordance with the teachings of the present invention, a long narrow board or plank is placed under each of the girders and beams to be covered and these boards or planks are known in the art as soffit boards. In the accompanying drawings, the soffit boards associated with the girders B are designated by the reference numeral 30, and those associated with the beams D are designated by the reference numeral 32. These soffit boards are preferably suspended from their respective girder or beam by suitable means such as loops or hangers 34 of wire and they are spaced from their respective girder or beam a suitable distance which will provide the predetermined thickness of fireproofing material to be applied to the adjacent face of the girder or beam. The width of each of these soffit boards is slightly greater than the width of the bottom or lower flange of the girder or beam with which it is associated and as will be noted by reference to the drawings, the wire loops 34 so position the soffit boards that they project substantially equal distances upon opposite sides of the bottom or lower flange of their respective girder or beam.

In fabricated structures as generally constructed the beams D have less vertical height than the girders B. Keeping in mind the fact that the thickness of fireproofing material encasing the girders and beams is substantially uniform, it will be apparent that the soffit boards 30 and 32 will occupy different horizontal planes. These soffit boards 30 and 32 when in different horizontal planes do not meet, and consequently there is a space or opening at the girder end of each soffit board 32 through which, unless some means were provided to prevent it, the fireproofing material would be free to escape during the pouring operation. To prevent this escape of fireproofing material through this aforementioned opening the soffit boards 32 are provided on that end adjacent a girder with an apron-like member 36, preferably in the form of a metal plate secured to the soffit boards by clips or light nails or tacks as indicated, or in any other manner. It is not necessary to disassemble the apron-like members 36 with relation to their respective soffit boards when the molds are disassembled.

With the soffit boards 30 and 32 in position, the joists are next placed in position. These joists are designated in the drawings by the reference numeral 38 and are generally hung from the beams B by wire loop hangers such as 40 although it is known that they may be supported in many other ways.

The joists 38 form the structure upon which, in the present invention, a plurality of mold supporting members are mounted and these joists 38, together with the soffit boards 30 and 32 are not new in the art of fireproofing and accordingly no claim is made thereto except as they function in connection with the novel features of the present invention and which will be hereinafter brought out.

In practicing the present invention, the molds which will be hereinafter described are supported by relatively long narrow members resting on one of their side edges upon the joists and except in special cases, they are arranged at substantially right angles thereto. One type of mold supporting member consists of a frame-like structure comprising two pairs of longitudinally-extending members 44 which are connected by spaced transversely-extending members 46. These transversely-extending members 46 have their ends positioned between the members 44 thus separating these members and providing spaces therebetween. The mold supporting members may be of any dimensions desired but I have found that convenient sizes which lend themselves readily to standard practices are lengths of approximately four feet, five feet six inches, and seven feet, by twenty inches in width. With these three sizes practically all average conditions can be met thus eliminating the necessity of building mold supporting members for each condition.

These mold supporting members are arranged in spaced relation to one another upon the joists 38, and inasmuch as it is necessary to employ means for supporting or maintaining them upon one of their side edges, it is highly desirable to have the spacing between the mold supporting members uniform and thereby permit the use of a spacing means of standard dimensions and form.

However, because of the fact that the spaces C between the girders and beams are not always of the same dimension, such an arrangement wherein the mold supporting members are uniformly spaced with relation to one another will not always properly position the molds in the proper relation to the girders and beams and at the same time provide sufficient stability to the molds when in position.

To meet the above condition and to provide the least number of types of spacing means for the mold supporting members, I have conceived the idea of arranging these mold supporting members in spaced groups with the mold supporting members in each group uniformly spaced with relation to one another, and providing means of an adjustable nature for retaining the groups in spaced relation and for preventing relative movement of them as groups. This phase of the invention will now be described in detail.

Figure 2:
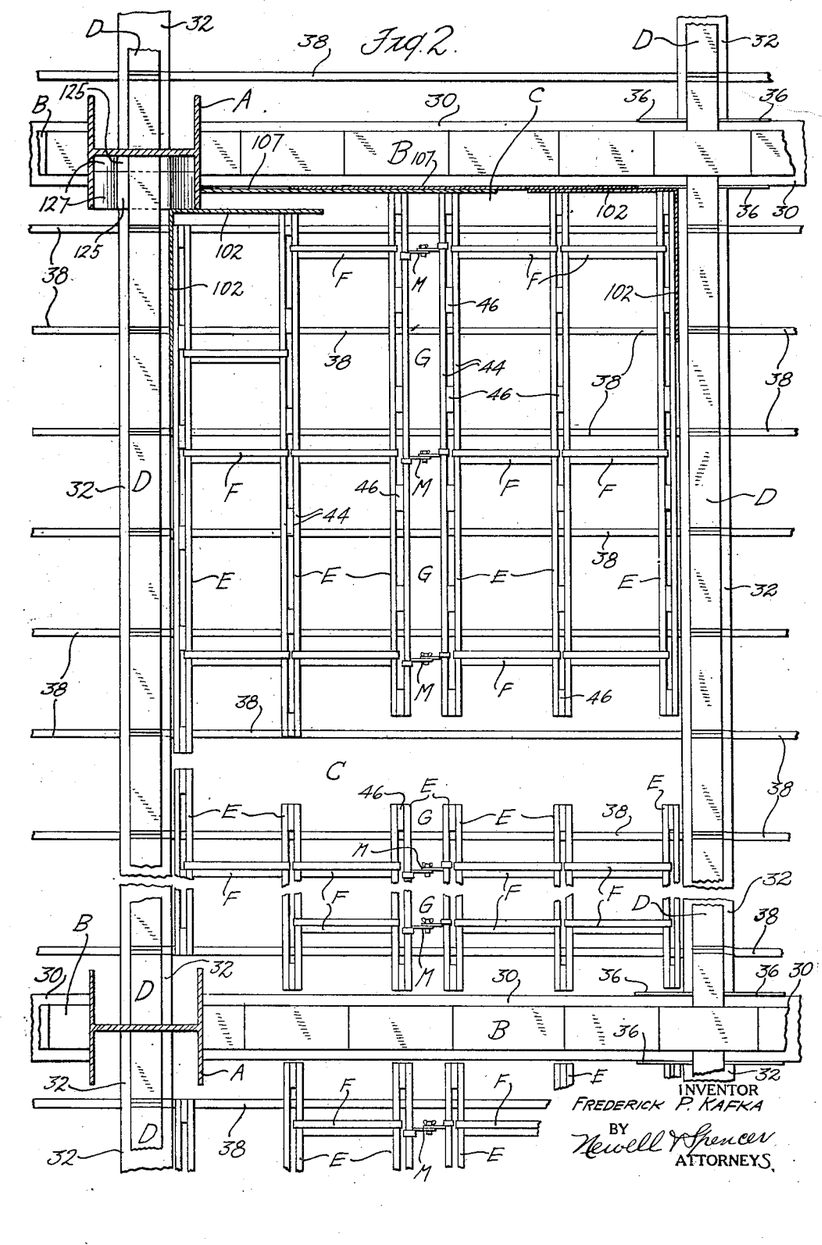
Figure 2 is a top plan view partly in horizontal section of a like portion of a fabricated structure showing the mold supporting members and their relation to one another.
Figure 3:
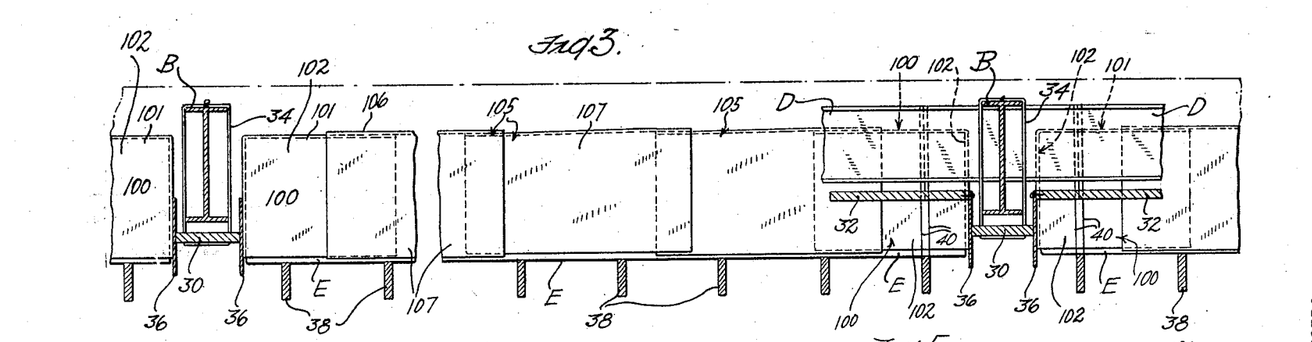
Figure 3 is a detail vertical sectional view taken on the line 3—3 of Figure 1.
Figure 4:
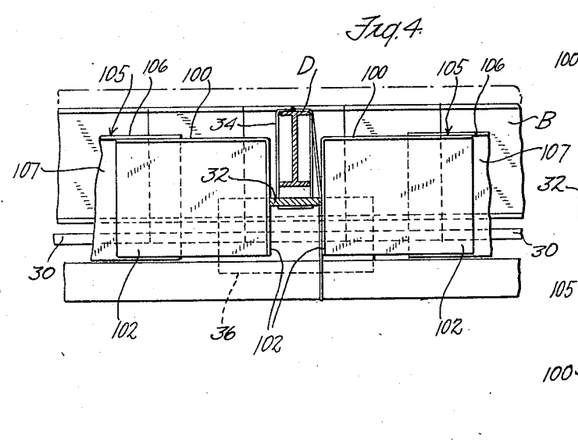
Figure 4 is a detail vertical sectional view taken on the line 4—4 of Figure 1.

By reference to Figure 2 of the drawings it will be noted that, as heretofore stated, the mold supporting members extend transversely of the joints 38 and are positioned thereon upon one of their side edges. In this figure there are shown two columns A, two girders B and two beams D, which form one of the rectangular spaces C heretofore described. In the upper lefthand corner of this figure there is shown a group of mold supporting members, they being designated by the reference character E. This group comprises three mold supporting members and they are arranged in uniform spaced relation to one another by means of spacers F, the preferred construction of which will be hereinafter described. Likewise in the upper righthand corner of this figure there is a group of three mold supporting members E, uniformly spaced with respect to one another and so held by spacers F. The foregoing is also true in the two lower corners of the figures, with the exception that the figure is broken at this point for the purpose of illustration. It will be noted that between the groups in each end of the rectangular space C, there is a space G which is smaller in transverse dimension than the space between the mold supporting members in the groups. It is desirable, though not absolutely necessary that this space G be smaller than the spaces between the mold supporting members of the groups as by so doing the spacers M employed for spacing the groups can be kept within smaller dimensions than would be possible if this practice were not followed. Such practice is easily followed since when the space G is greater than the spaces between the mold supporting members of the groups, it is only necessary to add one or more mold supporting members to one of the groups, they being added in sufficient numbers to reduce the transverse dimension of the space G until it is less than that of the spaces between the mold supporting members of the groups. These mold supporting members may be added in equal numbers to the several groups or not as may be desired since it is not essential to the successful operation of the invention that the groups of mold supporting members contain the same number thereof. Indeed one group may consist of but two and the other group may consist of but one or any number in excess thereof, and it will be therefore understood that the invention is not to be limited to any particular number of groups or to any number of mold supporting members in the groups. It is desirable, however, to employ a sufficient number of mold supporting members to fill each space C to a point where the spaces between the groups of the mold supporting members is less than the spaces between the individual mold supporting members of the groups. I do not wish to limit the invention to this particular arrangement, however, since the adaptability of the several standard parts to different sizes of spaces C between the girders and beams is not dependent upon the space between the groups being less than the spaces between the individual mold supporting members of the groups, and while it is not considered the best manner to so arrange the mold supporting members that the spaces between the groups is greater than that between the individual mold supporting members of the groups, I realize that such practice could be followed, since the flexibility of the present invention results rather from the arrangement of the mold supporting members in groups, and does not result from any predetermined dimension of space between the groups of mold supporting members.

Figures 11, 12, 13, 14, 15:
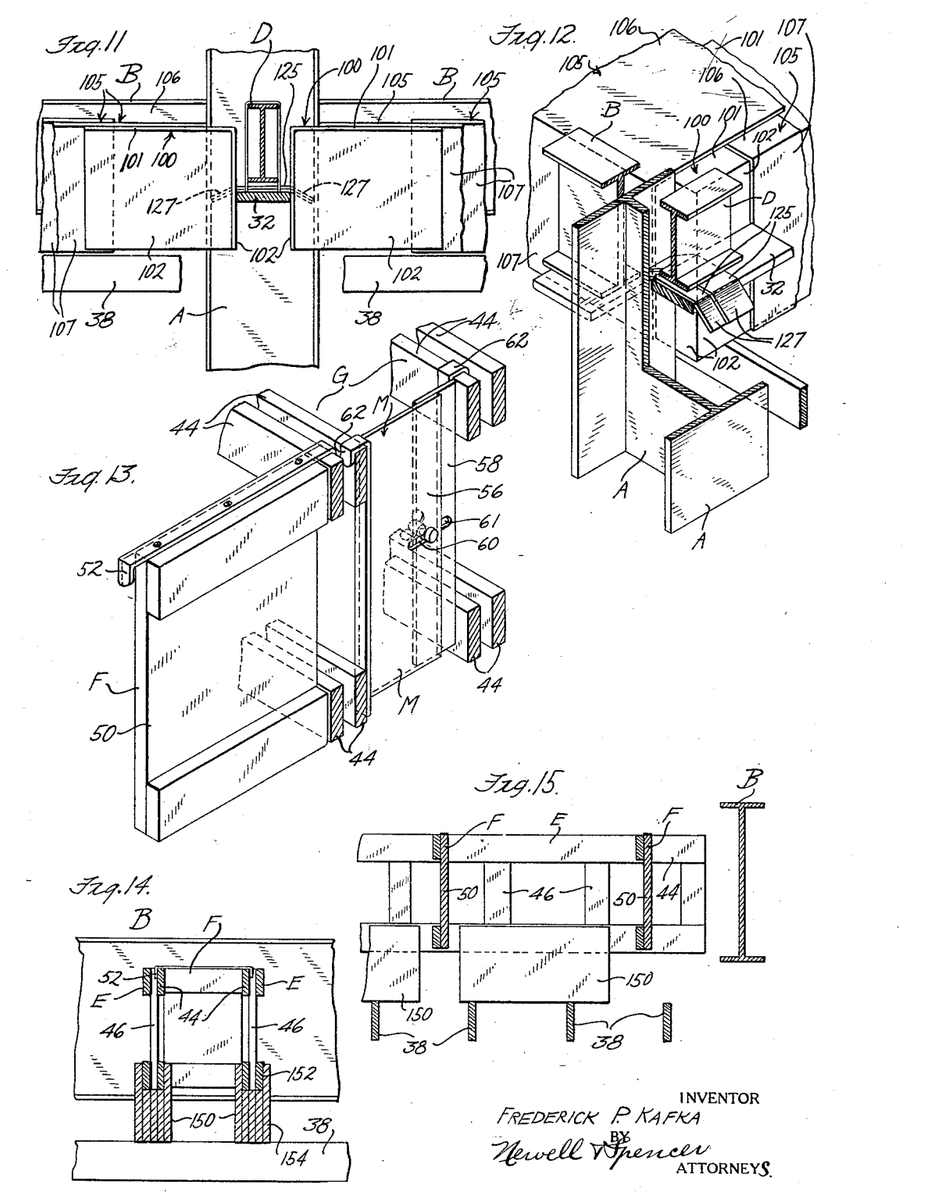
Figure 11 is a detail sectional view taken on the line 11—11 of Figure 1.
Figure 12 is a detail perspective view partly in section, the view having been taken at the point where the girders join a column.
Figure 13 is a detail perspective view showing the manner in which the mold supporting members are retained against movement in spaced groups.
Figure 14 is a sectional view showing a foot extension for the mold supporting members whereby they are adapted for use in connection with fabricated structures, the girders of which are of unusual depth.
Figure 15 is a detail sectional view taken at right angles to Figure 14.

One type of spacer F is shown in detail in Figure 13 of the drawings, and it consists of a rectangular body portion 50. These spacers may be constructed from any type of material such as wood, metal or the like and are provided with means for engagement with the mold supporting members to prevent accidental displacement of the spacers and mold supporting members relative to one another. This means may be of any desired type, but I prefer to use hook-like members such as 52 which are adapted to engage the mold supporting members in the space between the upper longitudinal members 44 thereof. Such a fastening means, if constructed from strap iron permits me to make the spacers F of wood, and when secured to one edge thereof, the strap provides a reinforcement for the spacers which materially increases the durability thereof.

The spaced groups of mold supporting members are retained in spaced relation by means of spacers M, and as shown in Figure 13 of the drawings, these spacers are of different construction than the spacers F. The spacers M preferably comprise two members 56 and 58 of sheet metal which are slotted as at 60 and 61 respectively for the reception of suitable fastening means such as a bolt and wing nut. This construction permits of the members 56 and 58 being adjustable to fit spaces G of varying width within certain limitations. I do not wish to limit myself to any particular size of members 56 and 58 but I do find that if the members 56 be approximately twice the width of the member 58, that two of such members secured together will meet practically all conditions. For example, two narrow members may be used together, one wide and one narrow member may be used together, or two wide members may be used together, and due to their adjustability, practically all conditions of spaces between groups can be met. Of course, these members 56 and 58 may be of any desired widths, but I have found that if the wider member be approximately eight inches in width and the narrower member be approximately four inches in width practically all conditions met in ordinary fabricated structures can be successfully handled. However, if it is desired to so erect the mold supporting members that the spaces between the mold supporting members is of smaller transverse dimension than that between the groups, then of course, different size members 56 and 58 must be employed and their size will be determined by the width of space between the groups of mold supporting devices which they are intended to span. Each of these members 56 and 58 is provided with a hook or similar fastening means 62 by which they are secured to the groups of mold supporting members in substantially the same manner as are the spacers F.

I am aware that spacers M of the adjustable type are not necessary to the successful operation of this invention and it is well within the scope of the invention to use other types of spacers M. For example, after the mold supporting members have been properly positioned in groups, the groups may be rigidly held in position by wedges or other devices bridging the spaces between the groups, or the groups of mold supporting members may be nailed to the joists 38. Many other means may be employed to prevent movement of the groups of mold supporting members as groups, and although at the present time I prefer adjustable spacers of the type herein described, I do not wish to be limited to the use of such a type of spacers.

Figure 5:
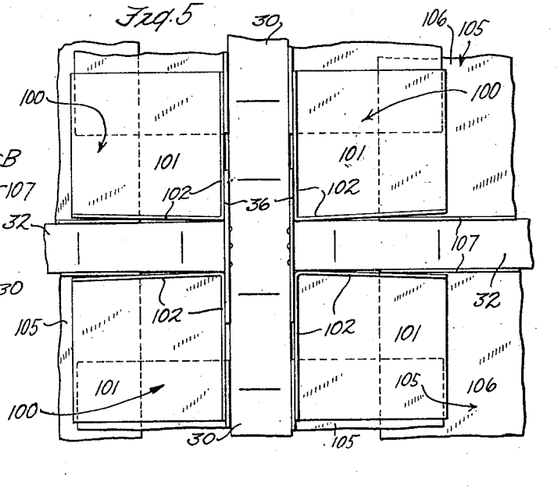
Figure 5 is a detail bottom plan view showing the positioning of the molds at a corner formed by the meeting of the beams and girders.
Figure 6:
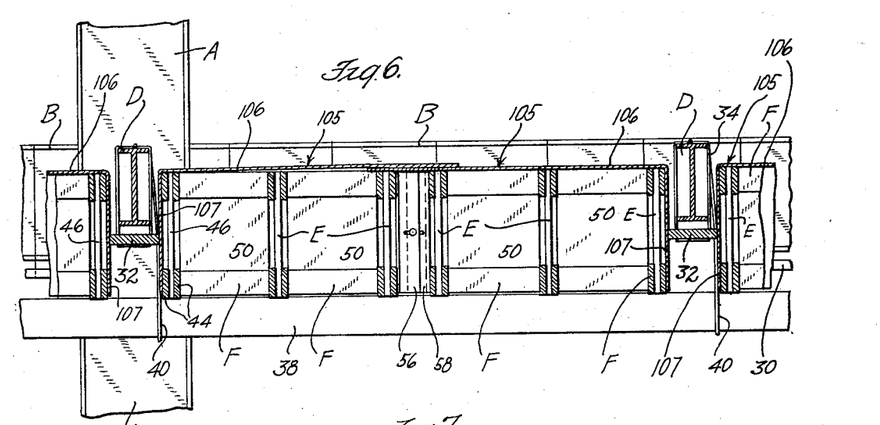
Figure 6 is a transverse sectional view taken on the line 6—6 of Figure 1.
Figure 7:
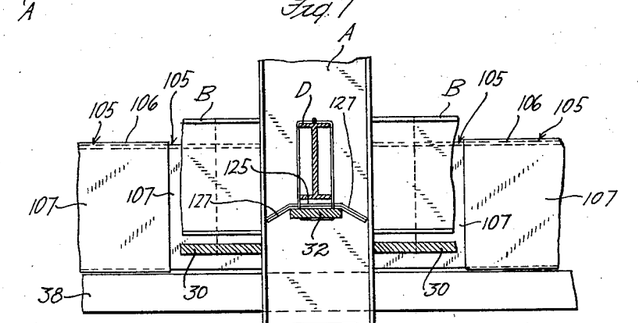
Figure 7 is a detail sectional view taken on the line 7—7 of Figure 1.
Figure 8:
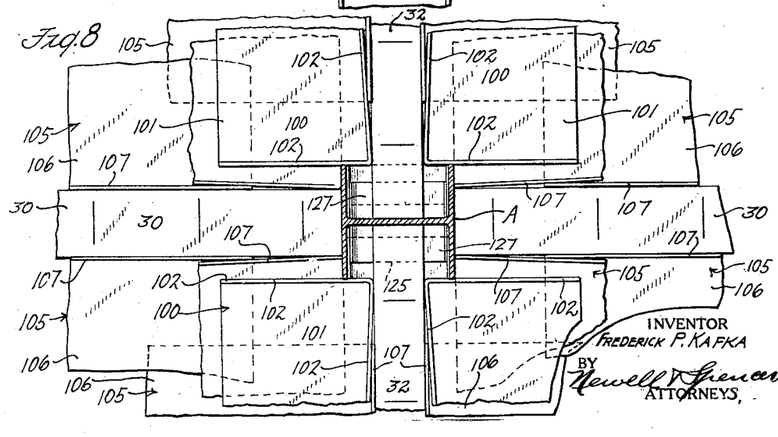
Figure 8 is a bottom plan view partly in section taken at a column at a point below the girder and beam soffit boards.
Figures 9, 10:
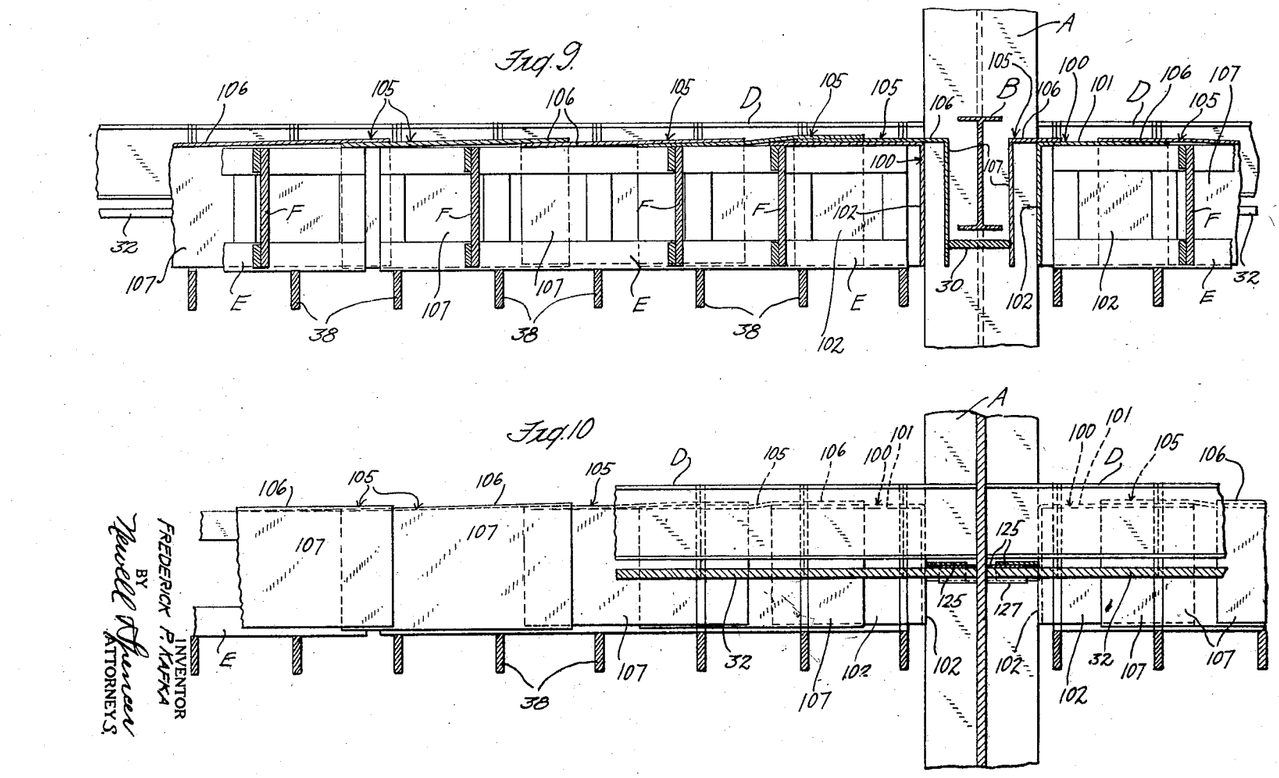
Figure 9 is a sectional view taken on the line 9—9 of Figure 1.
Figure 10 is a sectional view taken on the line 10—10 of Figure 1.

After the several mold-supporting members have been positioned as above described, the molds are positioned thereon to complete the structure for the pouring operation. These molds are preferably formed of metal, and are for the main part of two types, i. e. corner molds and side molds. The corner molds are designated by the numeral 100 in the accompanying drawings and as more clearly shown in Figure 5 each corner mold consists of a main flat top body portion 101 and two connected side walls 102 arranged at right angles to each other and also at right angles to the body portion 101. The side molds are designated by the reference numeral 105, and as more clearly shown in Figure 6, each of these side molds comprises a main flat top body portion 106 and a side wall 107 which projects from the body portion 106 at right angles thereto.

Figure 1:
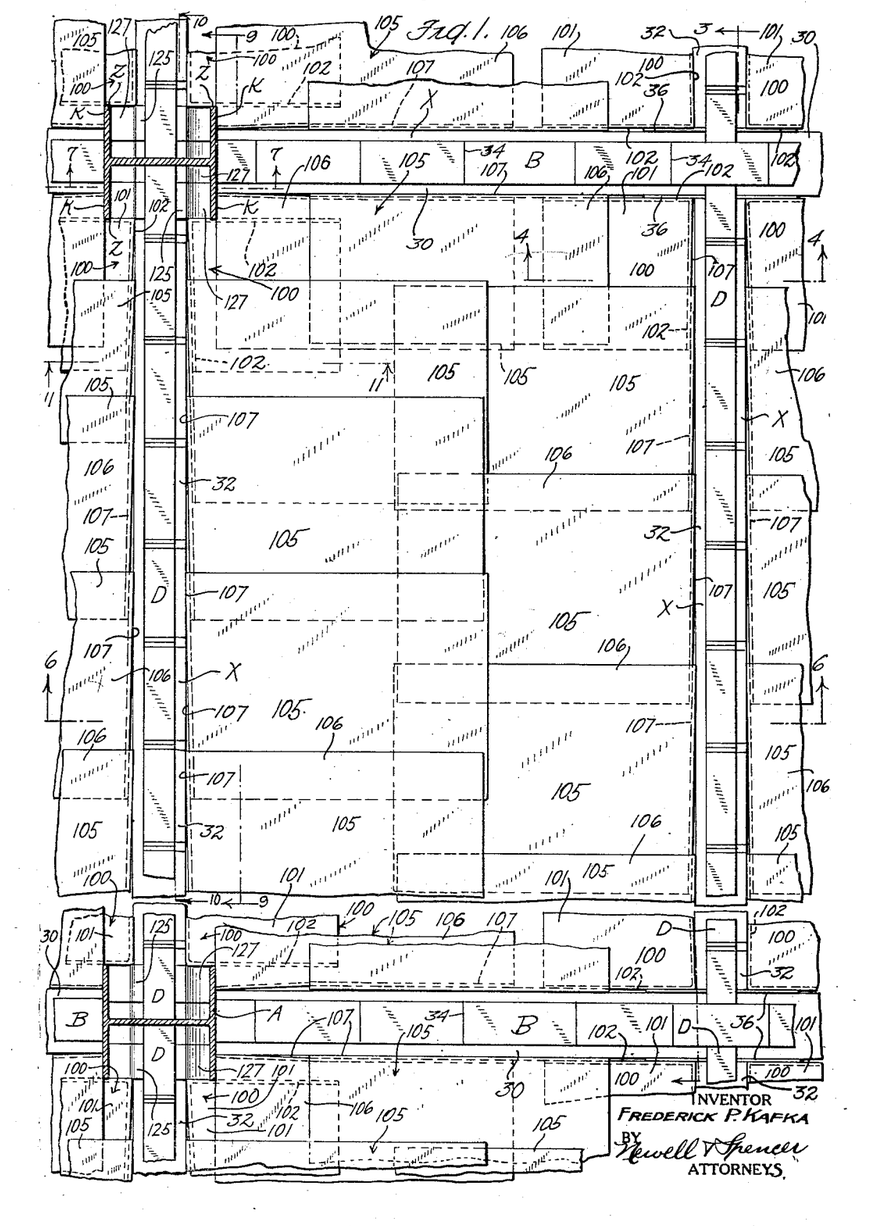
Figure 1 is a top plan view partly in horizontal section of a portion of a fabricated structure showing the soffit boards and molds in operative position.

In assembling the molds upon the built-up mold-supporting structure, the corner molds are preferably first placed in position, there being one of these corner molds placed in each corner of each of the rectangular spaces C. After a corner mold is placed in each corner of one of the rectangular spaces C, the side molds are positioned and as shown in Figure 1 of the drawings, these side molds overlap the corner molds, that is to say, the body portion of each corner mold is overlapped by the body portion of each side mold adjacent thereto. I preferably make the side molds of such proportion that a single side mold will be of sufficient length to overlap both corner molds at the short sides of the rectangular spaces C as shown in Figure 1. After the corner and side molds have been positioned along the girders B as above described, the remaining side molds are positioned along the beams D preferably in the overlapped relation shown in Figure 1, thus completely filling the rectangular spaces C and forming troughs such as X around each of the girders and beams of the fabricated structure.

It is to be understood that in placing the corner and side molds they are so positioned that their side walls engage the adjacent side edges of the girder and beam soffit boards 30 and 32 in such a manner that the soffit boards form the bottom of the trough which surrounds the girders and beams.

By reference to Figure 1, it will be noted that the corners where beams meet girders are completely closed and that the trough is complete. This latter is not true however of corners where girders meet with columns since the placing of the molds as thus far described, does not take care of the space between the web and the edges of the column flanges as is clearly shown in the upper left-hand corner of Figure 2 of the drawings. However, means is provided to take care of this condition and such means will now be described.

Where the girders meet the columns, one set of corner molds are positioned so that they engage the edge of the column flange as designated at Z in Figure 1, and the other adjacent set of side molds is so positioned that they engage their respective adjacent flat face of the column flange as indicated at K in the same figure.

With the corner molds in the position just described, there is a space between the depending side walls of those corner molds which engage the edge of column flanges and the web of the column, which space must be closed to complete the trough X which surrounds the beams D.

To close this space, two overlapping plates are employed, these plates being designated by the reference characters 125. As more clearly shown in Figures 11 and 12 these plates are preferably supported upon the soffit boards 32, and are bent downwardly as shown at 127. It is to be understood that the material from which these plates are formed is of such nature as to permit of their being readily bent to meet different conditions as they may be encountered. By employing two plates, adjustability is obtained which makes it possible to meet all conditions of width of column flanges.

In Figures 14 and 15 there is shown a means by which the mold supporting members E may be properly positioned when used in a structure in which girders and beams of extreme depth are employed. In order to adapt the mold supporting members E to this condition extensions 150 are employed. These extensions 150 rest upon the joists 38 as shown in Figures 14 and 15, and receive the mold supporting members therein as indicated at 152 in Figure 14. These extension members 150 may be constructed in any desired manner but one satisfactory way is that which is herein shown and consists of securing together a plurality of boards or planks 154 of different widths with the boards or planks of greatest width placed on the exterior to provide a mold supporting member receiving space 152. Ordinarily these extension members are not employed but have been found of value in meeting conditions where the girders and beams are of extreme depth.

Having thus described the construction employed, a brief description of its manner of use will now be given.

The soffit boards are first positioned beneath the girders and beams and are held in proper spaced relation thereto by means of the wire loops 34. After these have been positioned the joists 38 are positioned preferably by suspending from the beams D by means of hangers 40. After the soffit boards and joists have been positioned the mold supporting members are next arranged upon the joists in groups as heretofore described, they being held in spaced relation with respect to one another by the spacers F while the groups are held in spaced relation to one another by the spacers M. So far as described the assembled structure will appear as in Figure 2. After this has been done the column plates 125 are positioned on the soffit boards to close the space between the web and the edges of the flanges of the columns. After the structure has been thus far assembled the corner plates are positioned after which the side plates are positioned in overlapped relation to the corner plates and to one another and the spaces C are completely filled with the molds, and thus complete the troughs around the beams D. After this has been done the concrete is poured in the usual manner.

From the foregoing it will be apparent that the present invention provides a means whereby the girders and beams of a fabricated structure may be wholly enclosed in concrete or other fireproofing material and the floor and ceiling slabs are formed, and that after the fireproofing operation is completed the mold may be knocked down or disassembled without injury to any of the parts thereof. This is accomplished by merely severing the wire hangers 4, thereby releasing the joists 38 together with the mold supporting members and the molds themselves. By cutting the wire hangers or loops 34, the soffit boards are released, resulting in the exposure of the concrete slabs and the fireproofing of the various structural members in their complete state.

It is to be understood that the present invention has been shown in a preferred form only and that it is not to be limited to the precise construction described and shown and is capable of varied uses not herein shown but which rightfully fall within the purview of the appended claims.

What is claimed as new is:

1. A supporting means for molds for forming floor or roof slabs between the horizontal members of a fabricated building structure, comprising joists, means for retaining said joists in position, a plurality of standardized mold supporting members carried by said joists, said mold supporting members being spaced from one another and arranged in spaced groups, and means for maintaining said groups of mold supporting members in spaced relation to one another, with the spaces between the groups of a different dimension than the spaces between the mold supporting members of the groups.

2. A supporting means for molds for fireproofing the girders and beams of building structures and for forming floor or roof slabs therebetween, comprising joists, means for retaining said joists in position, a plurality of mold supporting members carried by said joists, said mold supporting members being spaced from one another and arranged in spaced groups with the spaces between the mold supporting members being greater than the spaces between the groups and means for maintaining said mold supporting members in such spaced relation.

3. A supporting means for molds for fireproofing the girders and beams of building structures and for forming floor or roof slabs therebetween, comprising joists, means for retaining said joists in position, a plurality of mold supporting members carried by said joists, said mold supporting members being spaced from one another and arranged in spaced groups, means for maintaining said mold supporting members in such spaced relation to one another, within the groups and separate means for maintaining said groups of mold supporting members in spaced relation as groups.

4. A mold for fireproofing the girders and beams of building structures and for forming floor or roof slabs therebetween, comprising soffit boards extending longitudinally of the girders and beams to be covered and spaced from the bottoms thereof, joists, means for retaining said joists in position, a plurality of mold supporting members carried by said joists and arranged in groups with the mold supporting members in each group spaced equally distant from one another, means for maintaining the mold supporting members in each group in such equally spaced relation, and means to maintain the groups of mold supporting members in spaced relation and prevent their movement as groups, said last mentioned means being adjustable to fit spaces of varying width between the groups.

Signed at New York, N. Y., this 18th day of March, 1929.

FREDERICK P. KAFKA.